US010748272B2

(12) United States Patent
Schwarzband et al.

(10) Patent No.: US 10,748,272 B2
(45) Date of Patent: Aug. 18, 2020

(54) MEASURING HEIGHT DIFFERENCE IN PATTERNS ON SEMICONDUCTOR WAFERS

(71) Applicant: Applied Materials Israel Ltd., Rehovot (IL)

(72) Inventors: Ishai Schwarzband, Or-Yehuda (IL); Yan Avniel, Rehovot (IL); Sergey Khristo, Ashdod (IL); Mor Baram, Nes-Ziona (IL); Shimon Levi, Kiryat-Tivon (IL); Doron Girmonsky, Raanana (IL); Roman Kris, Jerusalem (IL)

(73) Assignee: APPLIED MATERIALS ISRAEL LTD., Rehovot (IL)

( * ) Notice: Subject to any disclaimer, the term of this patent is extended or adjusted under 35 U.S.C. 154(b) by 67 days.

(21) Appl. No.: 15/982,918

(22) Filed: May 17, 2018

(65) Prior Publication Data

US 2018/0336675 A1 Nov. 22, 2018

Related U.S. Application Data

(60) Provisional application No. 62/508,312, filed on May 18, 2017.

(51) Int. Cl.
*G06K 9/00* (2006.01)
*G06T 7/00* (2017.01)
*G06T 7/60* (2017.01)

(52) U.S. Cl.
CPC .............. *G06T 7/0006* (2013.01); *G06T 7/60* (2013.01); *G06T 2207/30148* (2013.01)

(58) Field of Classification Search
CPC .................................................... G06T 7/0006
(Continued)

(56) References Cited

U.S. PATENT DOCUMENTS

| 8,538,130 B2 | 9/2013 | Ivanchenko et al. |
| 2003/0012422 A1 | 1/2003 | Sawai et al. |

(Continued)

FOREIGN PATENT DOCUMENTS

KR 1020150085956 7/2015

OTHER PUBLICATIONS

International Search Report and Written Opinion for International Patent Application Serial No. PCT/US2018/033480, dated Nov. 15, 2018, 13 pages.

(Continued)

*Primary Examiner* — Stephen P Coleman
(74) *Attorney, Agent, or Firm* — Lowenstein Sandler LLP (57) ABSTRACT

An improved technique for determining height difference in patterns provided on semiconductor wafers uses real measurements (e.g., measurements from SEM images) and a height difference determination model. In one version of the model, a measurable variable of the model is expressed in terms of a function of a change in depth of shadow (i.e. relative brightness), wherein the depth of shadow depends on the height difference as well as width difference between two features on a semiconductor wafer. In another version of the model, the measurable variable is expressed in terms of a function of a change of a measured distance between two characteristic points on the real image of a periodic structure with respect to a change in a tilt angle of a scanning electron beam.

20 Claims, 8 Drawing Sheets

(58) Field of Classification Search
USPC .......................................................... 382/145
See application file for complete search history.

(56) References Cited

U.S. PATENT DOCUMENTS

| | | |
|---|---|---|
| 2012/0076393 A1 | 3/2012 | Ivanchenko et al. |
| 2012/0267528 A1* | 10/2012 | Sakai .................. G03F 7/70466 |
| | | 250/307 |
| 2013/0026361 A1 | 1/2013 | Yamanashi et al. |
| 2013/0200255 A1 | 8/2013 | Schwarzband et al. |
| 2016/0071688 A1 | 3/2016 | Goto et al. |
| 2017/0040201 A1* | 2/2017 | Nakamura .......... H01L 21/6836 |
| 2018/0068050 A1* | 3/2018 | Lin ..................... G06F 17/5081 |

OTHER PUBLICATIONS

Roman, Kris et al., "Height and Sidewall Angle SEM Metrology Accuracy," Metrology, Inspection and Process Control for Microlithography XVIII, edited by Richard M. Silver, Proceeding of SPIE vol. 5375), May 24, 2004, 12 pages.

Zhang, Xiaoxiao et al., "Addressing FinFET metrology challenges in 1xnode using tilt-beam critical dimension scanning electron microscope"(J. Micro/Nanolith. MEMS MOEMS 13(4), 041407, Oct.-Dec. 2014, 8 pgs.

* cited by examiner

MEASURING HEIGHT DIFFERENCE IN PATTERNS ON SEMICONDUCTOR WAFERS

RELATED APPLICATIONS

The present application claims the benefit of priority from U.S. Provisional Application No. 62/508,312, filed May 18, 2017, entitled, "MEASURING HEIGHT DIFFERENCE IN PATTERNS ON SEMICONDUCTOR WAFERS," which is incorporated herein by reference in its entirety.

TECHNICAL FIELD

The present disclosure generally relates to measuring dimensions of patterns on semiconductor wafers, and specifically measuring height and/or width difference in patterns.

BACKGROUND

Scanning Electron Microscope (SEM) images are used in various mapping and imaging applications, such as for inspection of semiconductor wafers. Several techniques are known in the art for three-dimensional (3D) mapping of wafers using SEM images. For example, a conventional technique for inspecting semiconductor devices utilizes multiple sets of measurement data obtained by a SEM to determine the dimensional parameters of a semiconductor device. The SEM collects each set of data from a different angular orientation with respect to the device. The dimensional parameters of the semiconductor device are determined by analyzing the relationship between the SEM inspection angle and the collected data sets.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

Disclosed herein is an improved technique for determining height difference in patterns provided on semiconductor wafers, by using real measurements (e.g., measurements from SEM images) and using a height difference determination model. In this application, the term "pattern" encompasses any 3D structure created on a semiconductor wafer.

In one version of the model, a measurable variable of the model is expressed in terms of a function of a change in a depth of shadow (i.e. relative brightness), wherein the depth of shadow depends on the height difference as well as width difference between two features.

In another version of the model, the measurable variable is expressed in terms of a function of a change of a measured distance between two characteristic points on the real image of a periodic structure with respect to a change in a tilt angle of a scanning electron beam.

In both versions of the model, the height difference is calculated from the model by feeding real measurement data into the model.

In some implementations a system includes a module that is capable of extracting a height difference using one or both versions of the model, using a computer processor. The system may include a SEM to scan a wafer and a detector to produce one or more SEM images.

In some implementations, a non-transitory computer readable medium may include instructions which when executed by a processing device cause the processing device to perform a method that identifies a model having a variable expressed as a function of the height difference between a core trench and a gap trench, where the function has one or more parameters; performs measurements on a real image of the periodic structure to obtain values of the one or more parameters of the function of the height difference; and, determines, by a computer processor, the height difference using the model, and the obtained one or more parameters.

BRIEF DESCRIPTION OF THE DRAWINGS

The present disclosure will be understood more fully from the detailed description given below and from the accompanying drawings of various implementations of the disclosure.

FIGS. 1D(a)-(b) show a pattern feature having different height and width on two different wafers due to process variation, according to another embodiment of the present disclosure.

DETAILED DESCRIPTION

Aspects of the present disclosure are directed to determining height difference and/or both height and width difference between two features on the same semiconductor wafer, or height and/or width variation between same pattern features on two different semiconductor wafers due to process variation.

Patterns formed on semiconductor wafers usually comprise features/objects having various shapes and dimensions. Patterns may comprise periodic structure or irregular structure. Estimation of height difference (and/or both height and width difference) between such objects is often required for many purposes, for example, for inspection of semiconductor wafers during and/or after their manufacturing.

In the existing techniques, height difference is calculated by separately measuring absolute heights of individual features and comparing the two measurements. This disclosure describes a novel, more effective method for measuring height difference between two features without having to individually measure the respective absolute height of each of the two features.

The advantage of the approach in this disclosure is that the two features may or may not be physically adjacent to each other, as long as there is a relative height difference between the two features. In addition, width difference between the two features may be determined as an additional process control parameter. The two features may be part of a same pattern or parts of different patterns. Also, the two features may be the same feature on two different wafers. The term "same feature" broadly means features of the same type, for example as defined by the design intent file used for fabricating the features, or appear as substantially similar on the measurement data (e.g., data from SEM images). The term "same feature" may relate to features of the same type fabricated on a single wafer or on different wafers.

One example of pattern where height difference may be of interest is a material recess or a core-gap recess, which may appear between adjacent trenches in a periodic structure formed on a semiconductor wafer. The material recess may be understood as an averaged difference between depths/heights of neighboring trenches (i.e. a core trench and a gap trench) in a periodic structure. Material recess may be the result of multiple-patterning (such as double patterning) process used for semiconductor manufacturing.

Some of the trenches may be in the form of a channel with sidewalls, wherein the channel may have a closed contour or an open contour. Determining height difference (Δh) may be understood as determining an absolute value of Δh for any pair of channels (for example, for a specific core-gap pair of the pattern), and/or as determining an averaged value of Δh existing for similar channels in a region of interest within the periodic pattern.

The disclosed technique can also be used to evaluate dimensional difference in the same feature on different parts of a same wafer or on two different wafers due to process-induced variation. In the production of semiconductor devices accuracy, repeatability and stability of production processes to variations are of great importance. Process control techniques are implemented for controlling process inaccuracies and instability by measuring e.g. height and width of pattern during various production stages.

At certain scenarios, process control measurements and especially in-line SEM process control measurements may provide information about the deviation of pattern measures like height and width from a reference, based on analyzing shadowing information.

Figure 1A:
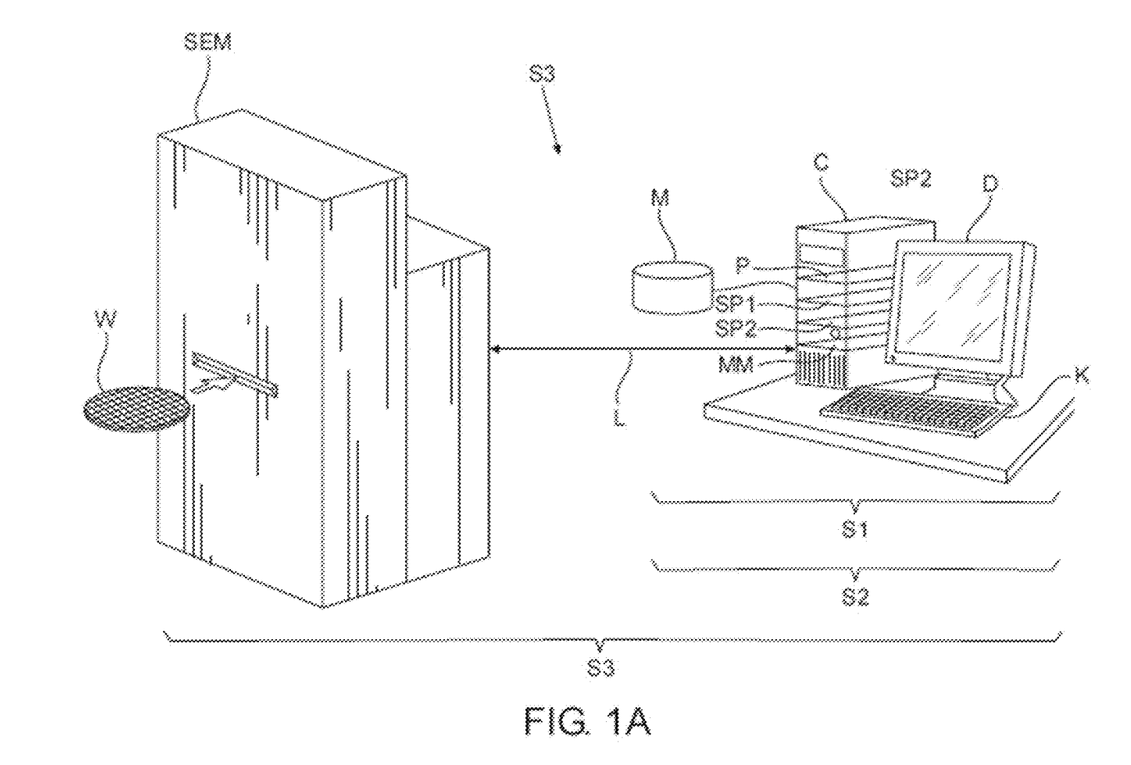
FIG. 1A illustrates a schematic block diagram of a system including a SEM and a computer system configured to use a model to determine height difference of a pattern in accordance with some embodiments of the present disclosure.

FIG. 1A illustrates an exemplary system S3 comprising inventive sub-systems S1 and S2. Sub-system S1 comprises the proposed inventive Height Difference Determining Module (HDDM) which includes one or more modeling processors SP1 (and SP2, if more than one processor is used). HDDM is located in a computer C and is configured to determine height difference Δh between features of a semiconductor pattern, by using at least one of the two versions of the model described in the present application. S1 is coupled to a computer memory M.

Computer C may receive data from SEM via a communication line L. SEM produces SEM images of the pattern manufactured on a semiconductor wafer W. If SEM or any separate measurement module is adapted to perform measurements using the SEM images, the measurement results will be transmitted to the sub-system S1. The sub-system S1 may be controlled by a control processor P which may obtain instructions from a user.

The second sub-system S2 comprises the HDDM (including modeling processors SP1 and/or SP2), a Measuring module MM and the control Processor P.

The measuring module MM receives images from SEM, performs accurate measurements of brightness, of various lengths/widths of the pattern, may partially process the measurements, and may be controllable by the processor P.

The sub-systems S1 and S2 may be placed in a free standing computer C provided with a display D and a keyboard K; the computer is connected to the SEM via a communication line L directly or indirectly.

The extended system S3 may further comprise the SEM incorporating a source of an electron beam and one or more detectors which are positioned so as to monitor the semiconductor wafer W, when inserted in the SEM, to collect brightness data (i.e., data representing the grey level on a SEM image). SEM may process the collected data from multiple detectors into a combined SEM image or may supply the collected data to the module MM for forming the combined image there-inside, performing measurements and partially processing the measurements.

Figure 1B:
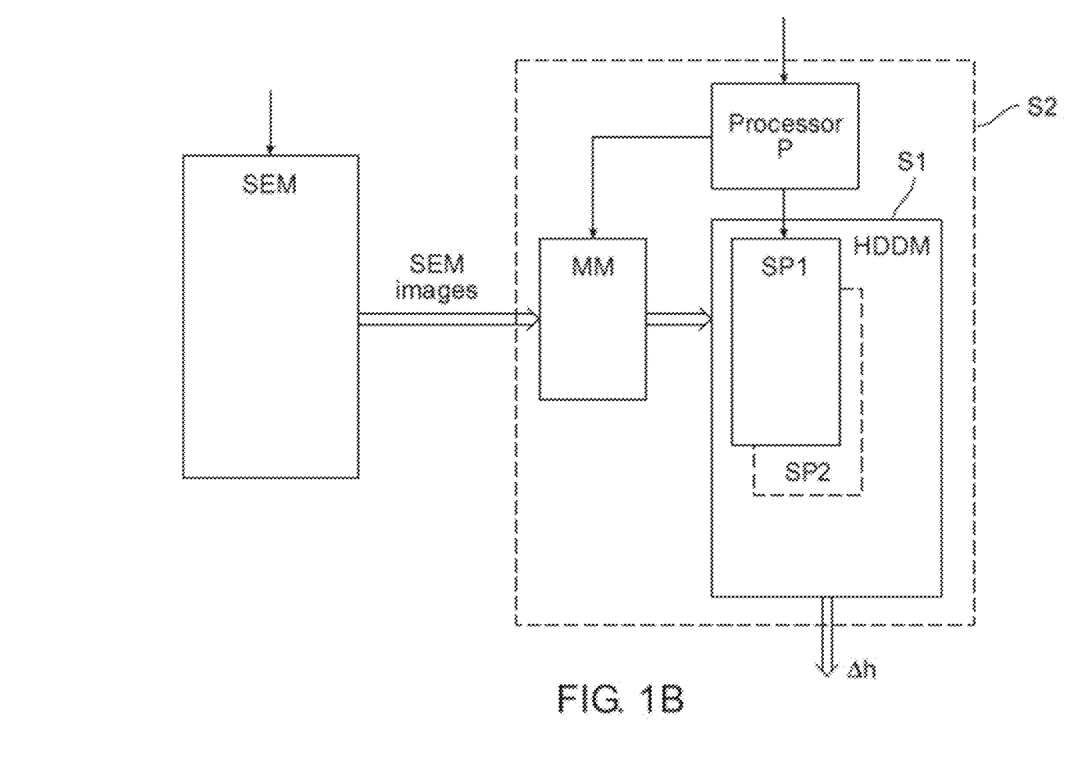
FIG. 1B is a schematic functional block diagram, including a height difference determining module (HDDM), in accordance with some embodiments of the present disclosure.

FIG. 1B illustrates a block diagram based on FIG. 1A, where functional and control inputs to blocks and modules are shown. Functional inputs/connections are shown by thick arrows, while control inputs/connections are indicated by thin arrows. It should be noted that a control processor P controls both MM and HDDM (which is part of S1). In this block diagram, the Measurement Module MM is shown as part of an inventive embodiment marked by a dashed contour as S2. The system S2 is installable in a computer which is connected to the SEM via L. Memory M and its connection are not shown here.

Figure 1C:
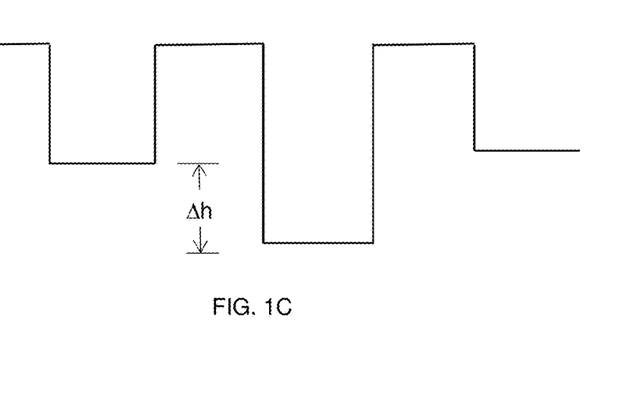
FIG. 1C shows a pattern with core-gap recess due to multiple patterning, according to an embodiment of the present disclosure.
Figure 1D:
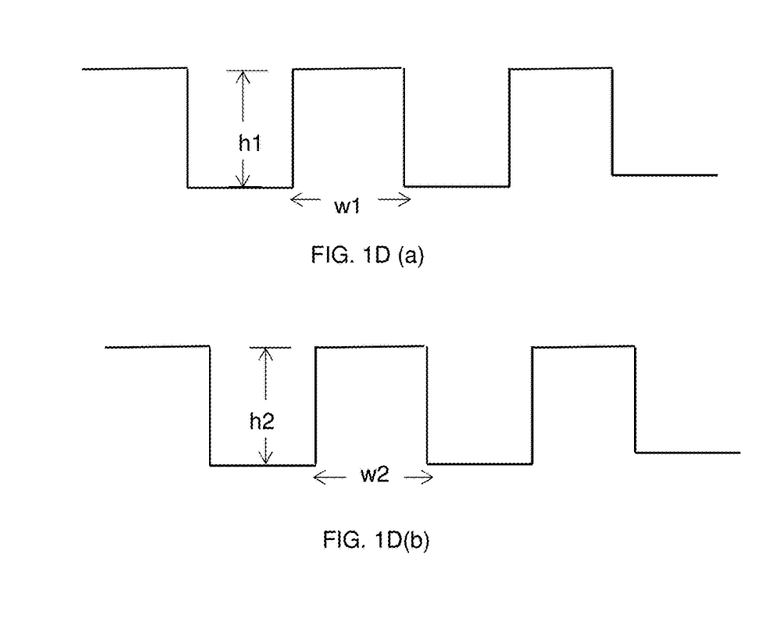

FIG. 1C shows that the HDDM may calculate Δh in a core-gap recess scenario, which is described in greater detail with respect to FIGS. 2B-FIG. 7. This is a problem typically associated with multiple patterning.

FIGS. 1D(a) and 1D(b) show that even if there is no material recess due to multiple patterning, there may be height difference (i.e. difference between h1 in FIG. 1D(a) and h2 in FIG. 1D(b)) between the same feature on two different wafers or same feature fabricated at different parts of the wafer due to process variation. Also there may be width difference (i.e. difference between w1 in FIG. 1D(a) and w2 in FIG. 1D(b)) due to process variation. The second wafer may be another wafer of the same design that is fabricated by the same production tool. The second wafer may be another wafer of the same design that is fabricated by a different production tool of the same type. The differences in height and/or width between the first wafer and the second wafer may result out of process variation, tool malfaction and the like.

Figure 2A:
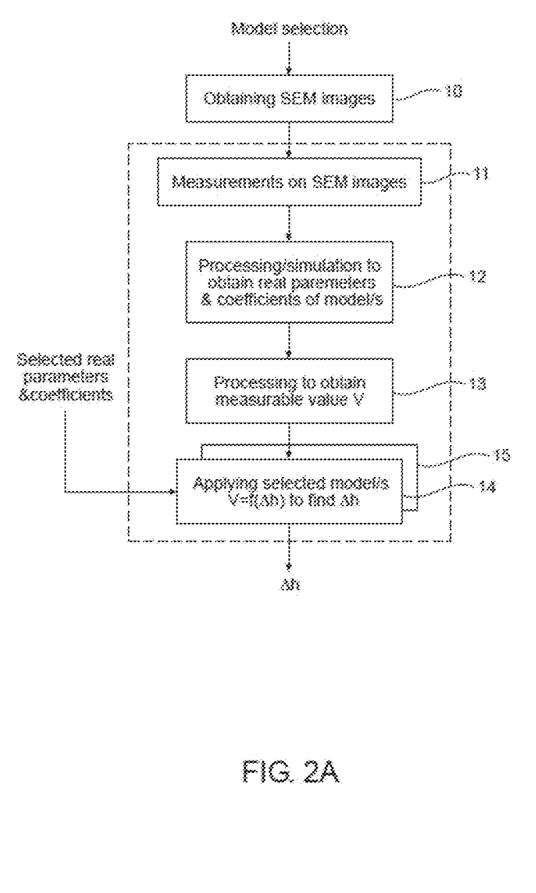
FIG. 2A is a flow diagram of an example method to determine height difference in a pattern using a model and real measurements, in accordance with some embodiments.

FIG. 2A shows a schematic flow chart of operations in the system S3, including operations of the system S2 (shown within a dashed rectangle in FIG. 1B). Operations of system S2 include operations of HDDM as system S1. The Measurement Module MM may comprise at least one of two embodiments for performing one and/or two sets of the measurements under control of the processor, for further processing the measurement results. The processing may start at the MM and terminate at the HDDM. However, the processing may be performed completely at the HDDM, so that actually MM may form part of HDDM. For example, the MM may comprise hardware and/or software blocks for measuring and processing grey level (brightness) of channels/trenches on the SEM images, and hardware and/or software blocks for measuring and processing a) width "w" of the channels; and/or b) distance ΔX between the channels, depending on which version of the model is chosen, or if both versions of the model are chosen, as elaborated below. The model may be chosen by a user, or may be selected by the processor.

SEM images of pattern of certain height show shadows indicative of pattern height, and are thus height dependent. With respect to an electron detector, electrons emanating from shadowed locations may be absorbed by the pattern and will not reach the electron detector. As a result, electron signal loss that is associated with shadowed locations is indicative of pattern geometry and shape—height and width.

According to an embodiment of the disclosure, SEM images of a pattern are processed by applying a model reflecting height-dependent shadowing associated with the pattern, to thereby determine a difference of height and/or width of the pattern in a SEM image in comparison to a reference.

In the core-gap example shown in FIG. 1C, the SEM image/s of core trenches may serve as a reference to the SEM images of the gap trenches. In the example shown in FIGS. 1D(a) and 1D(b), the pattern SEM image/s of the first wafer may serve as a reference to pattern SEM images of the second wafer. In both examples, information about height difference is determined. Note that the patterns shown in FIGS. 1D(a)-(b) are not limited to multiple patterning.

According to an embodiment of disclosure, the reference may be associated with an absolute dimension value—for example, height h1 or width w1 in FIG. 1D(a). The absolute height value may be obtained, for example, during a preliminary process control step such as SEM recipe set up step, or a complimentary measurement step employing non-inline measurement techniques such as OCD (Optical CD measurements) or TEM (transmission-electron microscopy). By using the absolute height value associated with the reference, and the height difference as determined, an absolute height value of the pattern may be obtained.

As mentioned above, height determination involves identifying a model having a variable V expressed as a function of the height difference Δh, i.e. V=f(Δh). V has a measurable value, and is a function of one or more real parameters, some of the real parameters capable of being measured. In one version of the model, the variable V is expressed as a function of a shadow depth, wherein the shadow depth depends on the height difference as well as the width difference between adjacent features. In another version of the model, the variable is expressed in terms of a change of a measured distance between two characteristic points on an SEM image with respect to change in a tilt angle of the electron beam used to obtain the SEM image. A user may select either version of the model to determine height difference. It is also possible to determine height difference using multiple versions of the model and compare the results for better accuracy. Persons skilled in the art would readily appreciate that blocks 10-15 in the flowchart shown in FIG. 2A operate according to the selected version of the model.

Upon selecting at least one version of the model V=f(Δh), one or more SEM images are obtained (block 10). SEM images may be obtained by scanning the wafer with an electron beam (and optionally changing tilt angle of the electron beam, depending on which version of the model is selected). Data from one or more electron detectors may be used to obtain combined SEM images. Alternatively, preselected known SEM image data may be used.

Next, measurements on the SEM image(s) are performed (block 11). This task may be performed at Measurement Module (MM), or the HDDM shown in FIG. 1B. Measurement may include performing statistical measurements or simulations in order to obtain real parameters and/or coefficients of the selected model (block 12), if they are not provided in advance, i.e. if they are not preselected, and calculating the measurable value V of the selected model (block 13).

The final operation of applying the selected version of the model to the measurement results (blocks 14 and/or 15) is performed by HDDM. If some real parameters or coefficients are pre-selected, they may be fed to 14 and/or 15. Below, the two versions of the model are described in greater detail.

Version 1 of Model: Determination of Height Difference from Relative Brightness (Depth of Shadow)

First, operation of the first version of the model is described, where height difference is calculated using a "depth of shadow" method that utilizes variation of brightness (grey-level difference) between the top and bottom of a feature. For the purpose of this application, "depth of shadow" refers to relative brightness, or relative grey-level. Brightness difference is related to the height difference, i.e. grey level difference is the result of a height difference. Grey level difference indicates loss of yield (of secondary electrons detected in SEM) due to the "shadow" created by features of different heights.

Figure 2B:
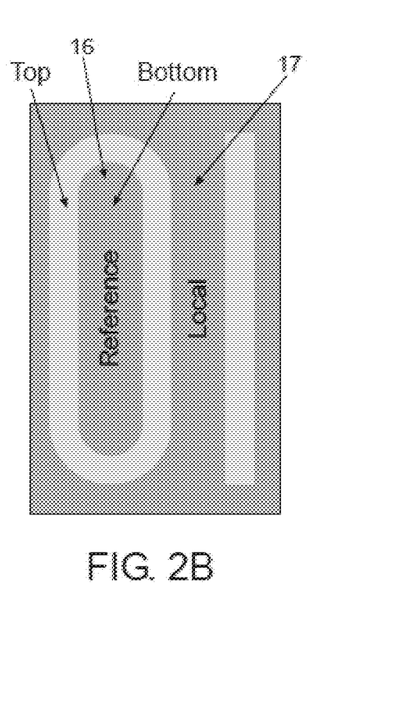
FIG. 2B schematically shows a portion of an exemplary SEM image comprising grey-level contours of a local and a reference channels, according to an embodiment disclosed herein.

FIG. 2b illustrates an exemplary portion of a grey-level SEM image, where top portions of the pattern are bright grey, while bottom portions are dark grey. Bright top portions of the pattern are more "illuminated" by secondary and back scattered electrons produced by a scanning electron beam and detected by at least one SEM detector (not shown). Dark bottom portions of the pattern produce less of the electrons, and are therefore detected by the same detector/s as darker sections of the SEM image.

The pattern comprises a first channel referred to as a "reference" channel 16 which is formed with a closed oval-like contour. A second channel referred to as a "local" channel is formed between the oval-like contour and a straight bar-like contour.

The model's first version, $V=\Delta\eta_{LR}=f(\Delta h, \Delta w_{LR})$ is based on the following two equations:

$$\eta_L=\eta(h_L,w_L); \text{ and}$$

$$\eta_R=\eta(h_R,w_R),$$

where values $h_L$ and $h_R$ of relative gray level are measured for the local object and for the reference object, values $w_L$ and $w_R$ of widths of the bottom channels are measured for the local object and for the reference object respectively.

The measurable value $\Delta\eta_{LR}$ and the real parameter $\Delta w_{LR}$ are calculated, and then $\Delta h$ is found using the function "f". The function "f" may be considered monotonic and may be built using a calibration process. When applying any known approximation to the function "f", a first approximation thereof can be linear and will require only two coefficients/parameters which will be called $\alpha$ and $\beta$. Such coefficients may be found by calibration, may be simulated or may be selected in advance.

Accordingly, the first version of the model may be substantially close to the following:

$$\Delta\eta_{LR}=\beta(\Delta h)+\alpha(\Delta w_{LR})$$

wherein coefficients $\alpha$ and $\beta$ respectively characterize dependence of the relative grey level $\eta$ from a channel width "w" and height "h".

Specifically, $$\Delta\eta_{LR}=\eta(\text{local})-\eta(\text{reference}),$$

where $\eta(\text{local})=Y_{local(bottom)}/Y_{local(top)}$, and, $\eta(\text{referenCe})=Y_{reference\ (bottom)}/Y_{reference\ (top)}$.

Y indicates the yield (brightness) at top or bottom of a pattern.

It should be understood that the local channel and the reference channel chosen for a specific measurement may be located quite far from one another on the SEM image, and that each channel is associated with its corresponding wall portion thus forming a bottom and a top of the channel. Moreover, for the proposed technique, one of the channels (say, the reference channel) does not have to be represented by its actual measurement. For example, it may be represented by an average value obtained in the process of measurements.

Figure 2C:
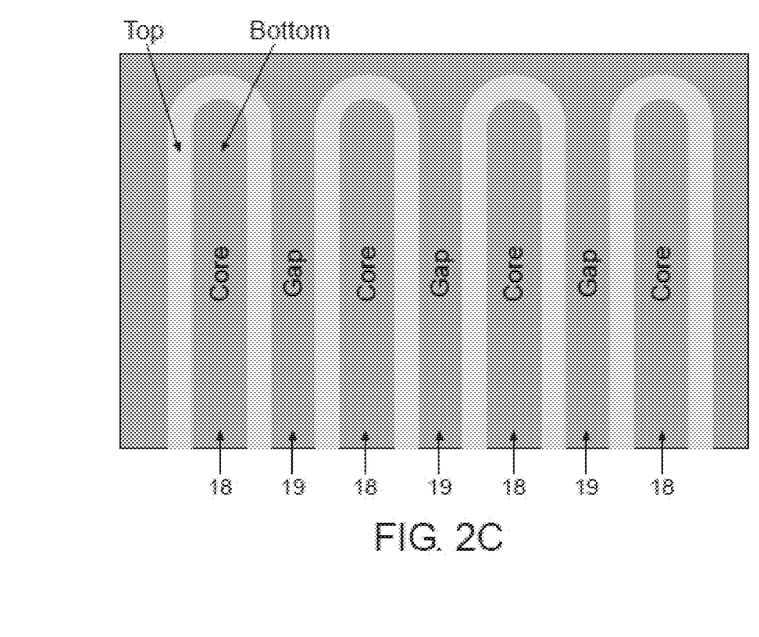
FIG. 2C schematically shows a portion of an exemplary SEM image comprising grey-level contours of core trenches and gap trenches in a periodic structure, according to an embodiment disclosed herein.

The local channel-reference channel methodology can be used to measure height difference in a core-gap pair, where core trenches are interleaved with gap trenches. FIG. 2c illustrates an exemplary portion of a SEM-image from a pattern comprising grey-level contours of core and gap trenches belonging to some periodic structure on a semiconductor wafer. In this illustration, each pair of adjacent trenches comprises one core trench 18 and one gap trench 19. Drawing parallel to the generic reference channel-local channel model discussed above, a core trench can be used as a reference channel and a gap trench can be used as a local channel, or vice versa. U.S. Pat. No. 8,538,130, owned by the assignee describes a CD metrology system and method of classifying similar structural elements, including core-gap pairs in a periodic structure fabricated on a semiconductor wafer.

Figure 3:
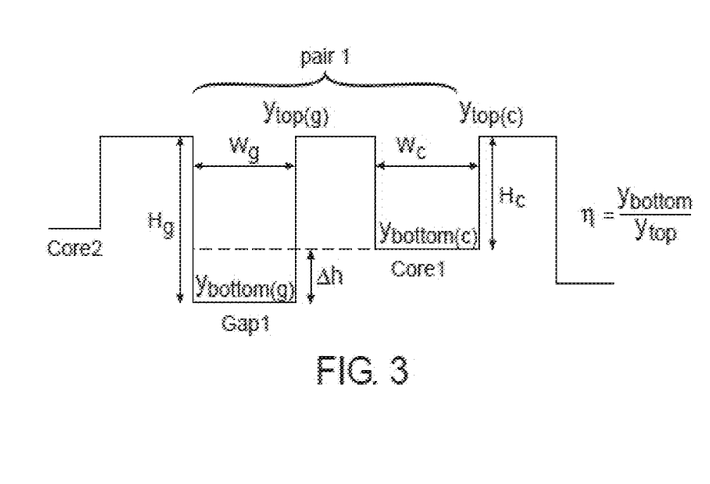
FIG. 3 illustrates a schematic illustration of an example pattern, indicating values to be measured for performing one version of a model to determine height difference, in accordance with one embodiment.

FIG. 3 is a schematic exemplary side view (or cross-section) of the periodic structure shown in FIG. 2c, where it can be noted that gap trenches 19 are deeper than core trenches 18, and there is a typical material recess ($\Delta h$ or height difference) between the core trenches and the gap trenches. The material recess is usually a result of multi-patterning techniques (such as double-patterning). A gap trench has height Hg which is greater than height Hc of the core trench. Widths Wg and Wc of the respective gap trench and core trench may also differ.

The ratio $\eta$ between grey-level brightness at a bottom ($y_{bottom}$) and brightness at a top ($y_{top}$) is measured twice, for a pair of adjacent gap and core trenches (for example, exemplary pair 1). The measured ratios differ due to different heights of the adjacent gap and core trenches.

The linear function of the proposed first version of the model for this case is expressed as:

$$\Delta\eta_{cg}=\beta(\Delta h)+\alpha(\Delta w_{cg}),$$

where $\Delta\eta_{cg}$ is the difference in brightness ratio (i.e. ratio between brightness at top ($y_{top}$) and brightness at the bottom ($y_{bottom}$)) for a core-gap pair, $\Delta h$ is the height difference for the core-gap pair, and $\Delta w_{cg}$ is the width difference for the core-gap pair. $\alpha$ and $\beta$ are coefficients that are either preselected or statistically calculated from measurements/calibration. The linear relationship shown in the above equation allows calculating $\Delta h$ based on the measurements of brightness ($y_{top(c)}$, $y_{bottom(c)}$, $y_{top(g)}$, and $y_{bottom(g)}$) and widths ($W_c$ and $W_g$) using a SEM image, while taking into account coefficients $\alpha$ and $\beta$ received in advance or derived by simulation and/or calibration. The coefficient $\alpha$ expresses dependence of $\eta$ from width of a trench ($d\eta/dw$). The coefficient $\beta$ reflects dependence of $\eta$ from height of a trench ($d\eta/dh$).

Figure 4:
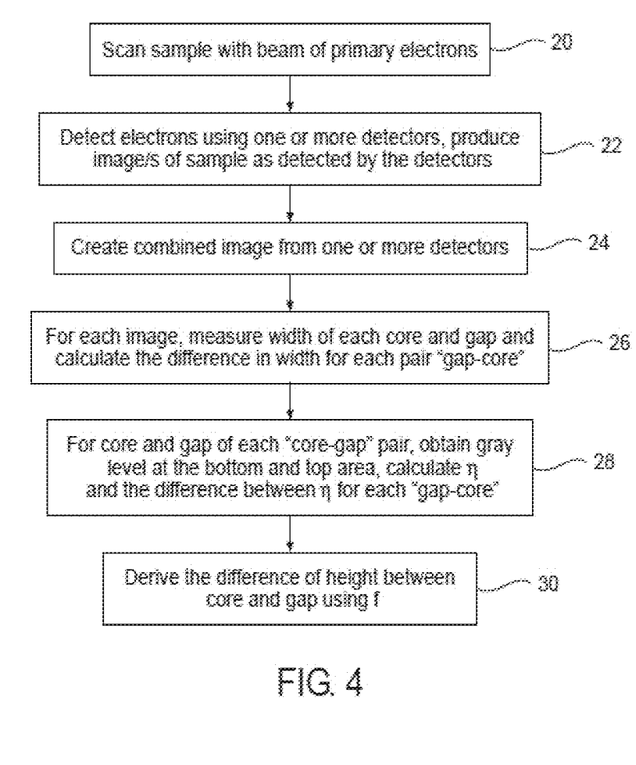
FIG. 4 is a flow diagram of an example method to determine height according to one version of a model, in accordance with one embodiment.

FIG. 4 is a flow diagram of an example method to determine height difference between adjacent core trench and gap trench using the version of the model described above. This application repeatedly mentions adjacent core trench and gap trench in a periodic pattern. However, the method may be modified within the scope of this disclosure for measuring $\Delta h$ of two channels in a non-regular pattern, with the two channels being considered "a pair" of gap-core. The method of FIG. 4 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 4 may be performed by the system shown in FIGS. 1A and 1B.

As shown in FIG. 4, the method may begin, at block 20, with scanning of a sample with a pattern on the wafer W by a beam of primary electrons. In block 22, one or more detectors of the SEM detect back scattered and secondary electrons. Based on the detector data, one or more SEM images of the wafer are produced by SEM. In block 24, the one or more SEM images are combined to create a combined SEM image. In block 26, width of each core-gap pair is measured, and their width difference is calculated. This function may be performed at the Measuring Module MM. For each core-gap pair, in block 28, gray level is measured at the bottom and at the top, calculating $\eta$ for gap and core and then calculating $\Delta\eta$. Upon calculating $\eta$ and $\Delta\eta$ for each core-gap pair, based on the performed measurement of the gray level, averaging may be done for a region of interest. Finally, in block 30, the height difference $\Delta h$ is derived, using the first version of the model for $V=f(\Delta h)$, wherein the function f is expressed as, $\Delta\eta_{cg}=\beta(\Delta h)+\alpha(\Delta w_{cg})$. Specifically, $\Delta h=(\Delta\eta_{cg}-\alpha\Delta w_{cg})/\beta$.

It should be noted that the measurable values and real parameters mentioned above may be absolute or averaged. They are absolute for a specific two channels, and may be averaged for a specific region of the pattern. The relative gray level (or brightness) 11 may be absolute or averaged. The absolute $\eta$ may be measured (calculated) for a specific gap/core in a specific core-gap pair, while the averaged r) may be measured (calculated) for a group of gaps/cores/pairs in a region of interest of the periodic structure.

Likewise, a real parameter "$\Delta w_{cg}$" is absolute when it is obtained by measurement of width "$w_c$" of the core trench and width "$w_g$" of the adjacent gap trench (of one core-gap pair) on a SEM image, while "$\Delta w_{cg}$" will be averaged if it is calculated for a region of interest, based on a number of absolute parameters "$\Delta w_{cg}$". The material recess "$\Delta h$" is absolute when measured for a specific core-gap pair, and will be averaged when calculated for a region of interest (based on a number of absolute "$\Delta h$", or based on the averaged "$\Delta w_{cg}$"). Further, the term "statistical measurements" may be understood, for example, as calibration using empirical data obtained by real measurements, or just as averaged real measurements.

Version 2 of Model: Determination of Height Difference by Varying Electron Beam Tilt Angle The second version of the model calculates height difference from a variable that can be expressed in terms of change of a measured distance between two characteristic points on the SEM image when the tilt angle of the scanning electron beam is changed. Persons skilled in the art would understand that "characteristic point" on a side view of a pattern can correspond to a "characteristic line" on the top view of the same pattern, and the distance between two characteristic points corresponds to the distance between the two parallel characteristic lines.

The characteristic line should be understood as a bright spot in the form of a strip positioned along a bottom edge of the periodic structure. Actually, such a characteristic line is found along a bottom corner between a bottom and a wall of the structure, the corner is reached by the tilted scanning electron beam and thus produces a relatively bright (characteristic) spot at the SEM image due to emission of electrons both from the wall portion and from the bottom portion of the corner.

Figure 5:
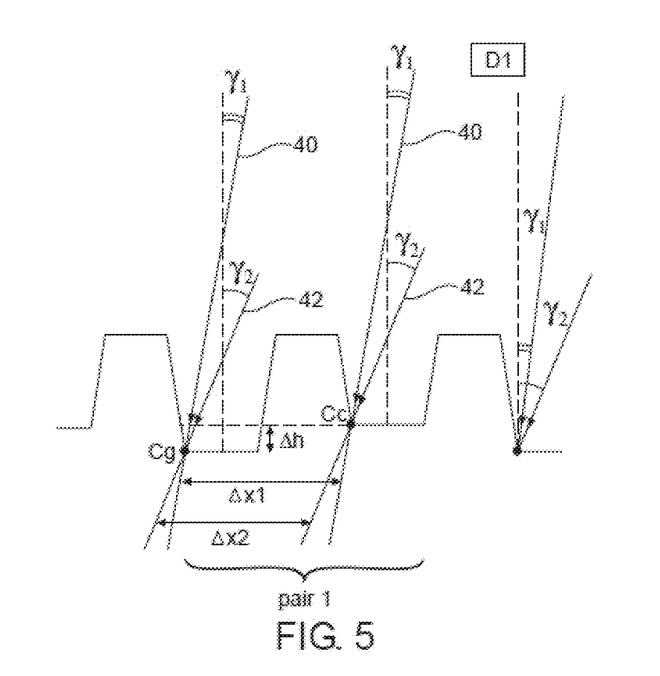
FIG. 5 illustrates a schematic illustration of an example pattern, indicating values to be measured for performing another version of a model to determine height difference, in accordance with one embodiment.

FIG. 5 shows a side view of the same pattern shown in FIG. 2c and FIG. 3, just with more realistic rounded contours. The pattern is first scanned with an electron beam 40 having a tilt angle γ1 relatively to an axis (dotted lines) vertical to the wafer's surface. Then the pattern may be scanned by an electron beam 42 tilted at γ2 which differs from γ1. The pre-condition is that for both of the angles, at least one detector D1 will register a characteristic line both at the bottom corner of gap trench (Cg), and at the bottom corner Cc of its adjacent core trench, gap and core trenches belonging to the same core-gap pair, here indicated as Pair 1. The characteristic lines at Cg and Cc will be seen as bright spots on a SEM image obtained from data collected by D1. The lines will change their positions when the tilt angle changes. This is shown in greater details in FIG. 6. An additional condition is that at least one detector should be able to register the characteristic lines for both of the tilt angles γ1 and γ2, in order to compare that detectors' SEM images and measure the distances ΔX1 and ΔX2 on them.

The distances ΔX1 and ΔX2 measured between the characteristic lines at Cc and Cg, obtained for different tilt angles for the same core-gap pair, are then used for calculating the material recess Δh of that core-gap pair.

Figure 6:
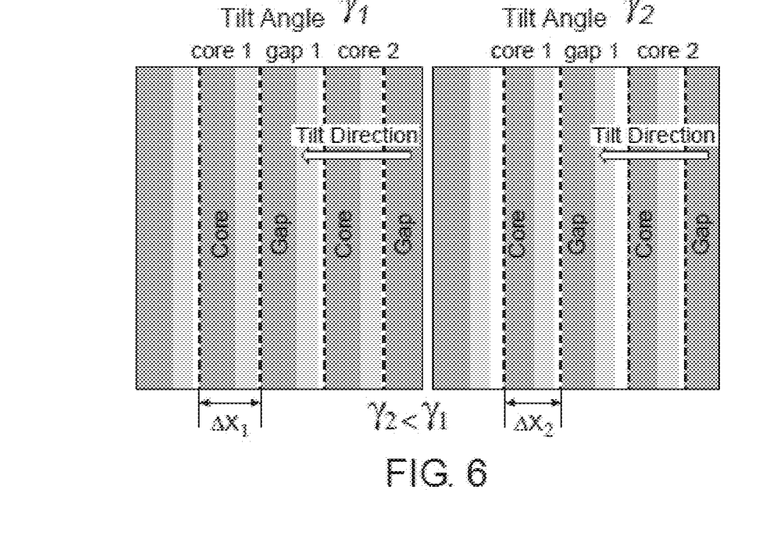
FIG. 6 is a portion of an SEM image, simplified to illustrate the version of the model referred to in FIG. 5.

FIG. 6 shows a schematic, simplified portion of a SEM-image of the pattern shown in FIG. 2c and FIG. 5, where the characteristic lines created at different tilt angles are schematically shown as white portions between light grey tops and dark grey bottoms of the regular structure. The characteristic lines at tilt angle γ1 appear narrower, while those at the tilt angle γ2 appear wider, since γ1<γ2. The tilt direction is schematically shown by thick arrows. Distances ΔX are measured for a specific core-gap pair, between right ends of the characteristic lines (the right ends are marked by black dashed lines). It should be noted that the characteristic lines at the shallow cores are wider than those at the deeper gaps.

For example, distance ΔX1 is measured for the core-gap pair 1 (core 1 and gap 1) between characteristic lines which appear on the SEM image obtained at the tilt angle γ1. Distance ΔX2 is measured for the same core-gap pair 1 between characteristic lines which appear on the SEM image obtained at the tilt angle γ2. Similar distances may be measured for another core-gap pair (for example pair 2 comprising gap 1 and core 2.) It can be seen, that the distance ΔX changes with changing the tilt angle. Since that change is a function of height difference between the core-gap pair, the height difference can be derived from ΔX using a proper version of the model.

It should be understood that the above-mentioned measurable value Δ(ΔX) may be calculated from two values of a distance (ΔX) measured using two respective SEM images obtained for two different tilt angles γ of the scanning electron beam. For example, two tilt angles may be selected, and the value Δ(ΔX) may be obtained for a specific "core-gap" pair.

Figure 7:
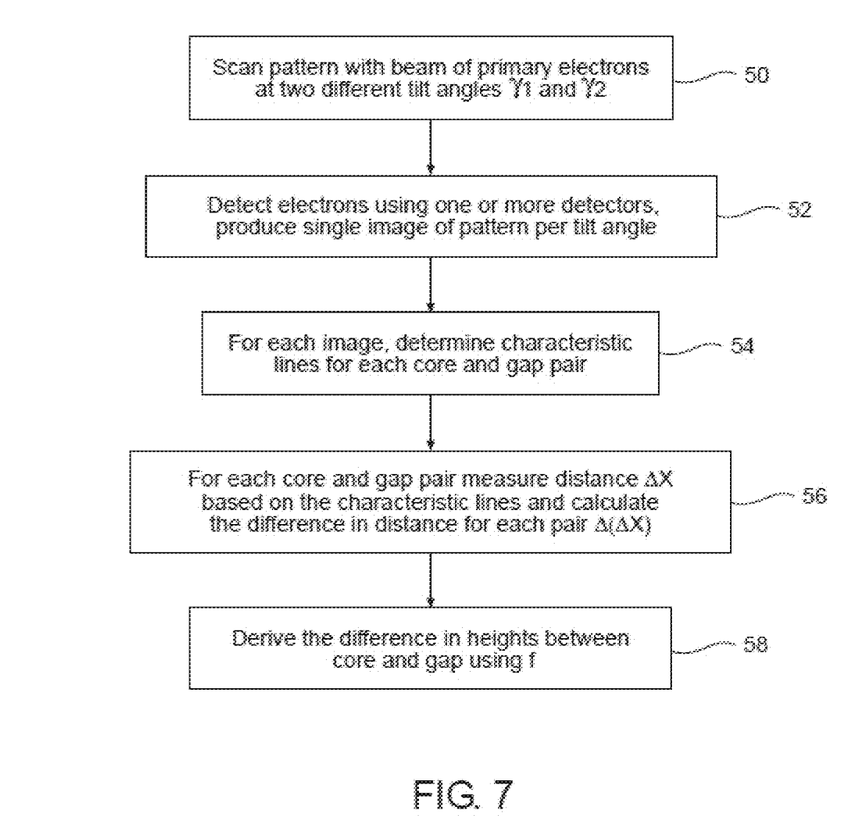
FIG. 7 is a flow diagram of an example method to determine height according to the version of the model referred to in FIG. 5, in accordance with another embodiment of the present disclosure.

FIG. 7 is an exemplary flow chart for performing the method according to version 2 of the mode. The method of FIG. 7 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. Also, the pattern may be a periodic structure or an irregular structure with a material recess. In some embodiments, the method of FIG. 4 may be performed by the system shown in FIGS. 1A and 1B. It should be noted, that at least one detector is necessary for implementing this model.

The method of FIG. 7 starts at block 50 with scanning the pattern with a beam of primary electrons at two tilt angles γ1 and γ2. Next, in block 52, secondary and back scattered electrons are detected by one or more detectors, thereby producing a corresponding SEM image for each tilt angle. Note that the SEM image may be a combined image using data from multiple detectors. In block 54, for each SEM-image obtained for a specific tilt angle, characteristic lines produced at that specific tilt angle for each core-gap pair are identified. In block 56, for each specific core-gap pair, the distance ΔX1 and ΔX2 between the characteristic lines at two different tilt angles are measured. Thereafter, the difference between such distances, i.e., Δ(ΔX) is calculated. In block 58, Δh is calculated using the function of version 2 of the model, where the variable Δ(ΔX) is a function of Δh, as shown in the following equation: $\Delta(\Delta X) = (\Delta(tg\gamma)) \cdot \Delta h$, where (Δ(tgγ)) is the function "f" in V=f(Δh), which reflects change of the tilt angle.

To summarize, the method of measuring the measurable value V in the second version of the model, may for example comprise the following sub-steps:

selecting two real parameters of the function "f" by selecting two different angles for the electron beam, as angles γ1 and γ2, and calculating a third real parameter Δtgγ as (tg(γ1)−tg(γ2));

scanning the regular structure with the electron beam tilted at the angle γ1, and then at the angle γ2, obtaining two SEM images Iγ1 and Iγ2 of the pattern for the two respective different angles γ1 and γ2, determining two characteristic lines of a pair of channels (say, adjacent core and gap trenches) for each of the two images Iγ1 and Iγ2, (wherein the two characteristic lines are those produced on said images by bottom corners Cc and Cg of the pair of adjacent core and gap trenches when illuminated by the tilted electron beam);

determining the distance ΔX between the two characteristic lines of the pair of channels, for each of the two images Iγ1 and Iγ2, measuring the value V as a difference Δ(ΔX) between the distance ΔX determined in the image Iγ1 and the distance ΔX determined in the image Iγ2.

The height difference Δh is then determined as, Δh=Δ(ΔX)/(Δ(tgγ)), wherein Δtgγ=tg(γ1)−tg(γ2).

A region of interest may be selected on the periodic structure of the wafer, and then absolute measurements (and/or absolute calculations made based on the absolute measurements) may be averaged along one or more axes/directions preselected in the region of interest. This introduces a tradeoff between accuracy of the measurements and proper estimation of the height difference in a particular region of the wafer, or the entire wafer.

Figure 8:
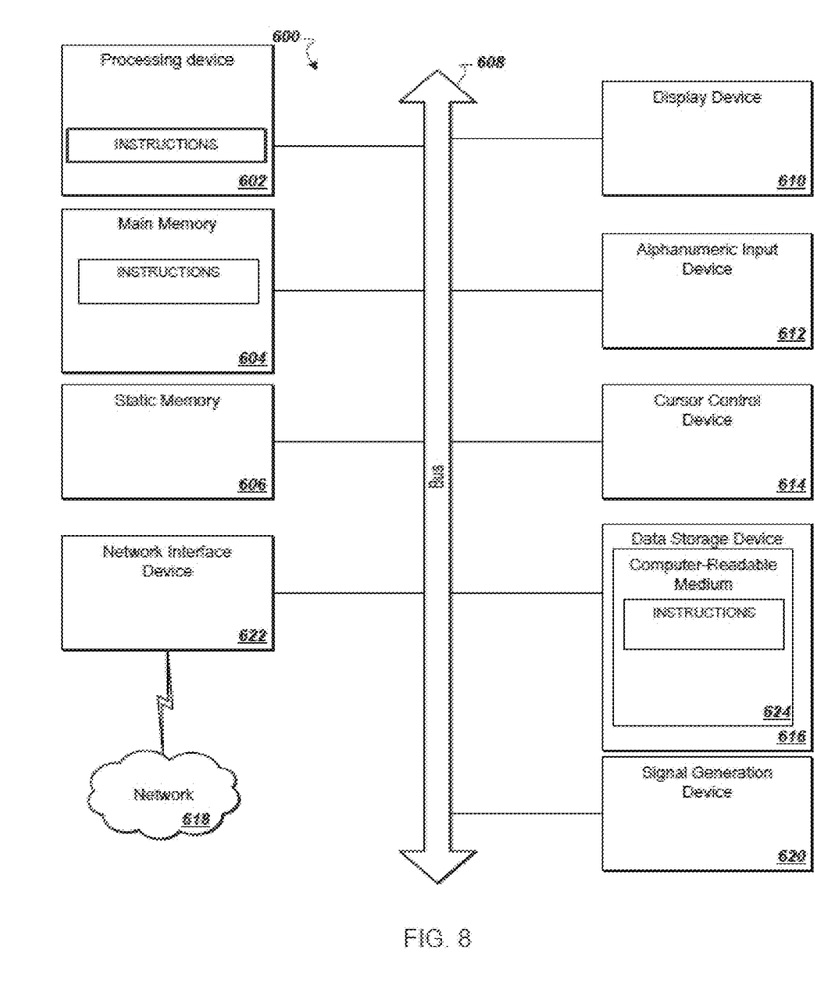
FIG. 8 is a block diagram of an example computer system in which implementations of the present disclosure may operate.

FIG. 8 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) etc.), a static memory 606 (e.g., flash memory, static random access memory (SRAM), etc.), and a data storage device 616, which communicate with each other via a bus 608.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions for performing the operations and steps discussed herein.

The computer system 600 may further include a network interface device 622 to communicate over the network 618. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse or a touch pad),), a signal generation device 620 (e.g., a speaker), a graphics processing unit (not shown), video processing unit (not shown), and audio processing unit (not shown).

The data storage device 616 may include a machine-readable storage medium 624 (also known as a computer-readable medium) on which is stored one or more sets of instructions or software embodying any one or more of the methodologies or functions described herein. The instructions may also reside, completely or at least partially, within the main memory 604 and/or within the processing device 602 during execution thereof by the computer system 600, the main memory 604 and the processing device 602 also constituting machine-readable storage media.

In one implementation, the instructions include instructions to implement functionality corresponding to a height difference determination. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD- ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A computer-implemented method for determining a height difference between two features in a pattern on a semiconductor wafer, the method comprising:
    identifying a model having a variable expressed as a function of the height difference, wherein the function has one or more physical parameters and one or more quantities characterizing interdependence of the one or more physical parameters;
    performing measurements on a real image of the pattern on the semiconductor wafer to obtain values of the one or more physical parameters of the function of the height difference; and
    determining, by a computer processor, the height difference from the model using the obtained values of the one or more physical parameters and the one or more quantities characterizing the interdependence of the one or more physical parameters.

2. The method of claim 1, wherein the height difference is between a first feature and a second feature on the same semiconductor wafer.

3. The method of claim 1, wherein the height difference is between a first value and a second value of certain dimension of a feature fabricated on two different semiconductor wafers.

4. The method of claim 1, wherein performing the measurements comprises using a scanning electron microscope (SEM) to obtain the real image of the periodic structure.

5. The method of claim 4, wherein the variable in the model is expressed in terms of change of a measured distance between two characteristic points on the real image of the periodic structure with respect to a change in a tilt angle of a scanning electron beam, wherein the measured distance indicates a distance between a core trench and a gap trench, and wherein the distance is dependent on the height difference between the core trench and the gap trench.

6. The method of claim 5, wherein obtaining values of the one or more physical parameters includes: obtaining a value indicating change in the tilt angle of the scanning electron beam.

7. A computer-implemented method for determining a height difference between a core trench and a gap trench in a periodic structure, the periodic structure comprising a plurality of core trenches and a plurality of gap trenches formed on a semiconductor wafer, the method comprising:
    identifying a model having a variable expressed as a function of the height difference between a core trench and a gap trench, wherein the function has one or more physical parameters and one or more quantities characterizing interdependence of the one or more physical parameters;
    performing measurements on a real image of the periodic structure to obtain values of the one or more physical parameters of the function of the height difference; and
    determining, by a computer processor, the height difference from the model using the obtained values of the one or more physical parameters and the one or more quantities characterizing the interdependence of the one or more physical parameters.

8. The method of claim 7, wherein the periodic structure is created using a semiconductor processing technique comprising multiple patterning.

9. The method of claim 7, wherein performing the measurements further comprises:
    scanning the periodic structure at a first tilt angle of the scanning electron beam to obtain a first real image of the periodic structure;
    scanning the periodic structure at a second tilt angle of the scanning electron beam to obtain a second real image of the periodic structure, wherein the second tilt angle is different from the first tilt angle;
    identifying a pair of characteristic points on the first real image and measuring the distance between characteristic points in the pair;
    identifying the same characteristic points on the second real image and measuring the distance between the characteristic points in the pair; and
    expressing the variable of the model in terms of change in the measured distance with respect to change in the tilt angle of the scanning electron beam.

10. The method of claim 9, wherein each pair of characteristic points is produced on the real image based on respective bottom corners of a core trench and a gap trench when illuminated by the scanning electron beam tilted at a certain angle.

11. The method of claim 10, wherein the method further comprises:
    identifying multiple pairs of characteristic points on the first and the second real images, each of the multiple pairs of characteristic points being produced by a corresponding pair of core trench and gap trench.

12. The method of claim 11, wherein expressing the variable in terms of change in the measured distance comprises:

calculating an average of measured distances obtained from the multiple pairs of characteristic points; and expressing the variable in terms of change in the average measured distance.

13. The method of claim 7, wherein the variable is expressed as a function of a change in depth of shadow, wherein the change in depth of shadow depends on the height difference as well as width difference between a core trench and a gap trench.

14. The method of claim 13, wherein the depth of shadow represents difference in relative brightness between the core trench and the gap trench.

15. The method of claim 14, wherein the model is created from a linear function:

$$\Delta\eta = \alpha\Delta w + \beta\Delta h,$$

where $\eta$ indicates brightness ratio for grey level calculation, $\Delta\eta$ indicates difference of $\eta$ between a core trench and a gap trench, $\alpha$ and $\beta$ are coefficients, $\Delta w$ is width difference and $\Delta h$ is height difference between a core trench and a gap trench.

16. The method of claim 15, where grey level calculation involves brightness measured at the top and bottom of the core trench and the gap trench.

17. The method of claim 15, wherein the coefficients $\alpha$ and $\beta$ are obtained by calibration or simulation.

18. The method of claim 15, wherein performing measurement on a real image comprises obtaining a value for the width difference $\Delta w$ between the core trench and the gap trench.

19. A system for determining a height difference between a core trench and a gap trench in a periodic structure, the periodic structure comprising a plurality of core trenches and a plurality of gap trenches formed on a semiconductor wafer, the system comprising:

a memory;

a processing device, operatively coupled with the memory, to:

identify a model having a variable expressed as a function of the height difference between a core trench and a gap trench, wherein the function has one or more physical parameters and one or more quantities characterizing interdependence of the one or more physical parameters;

obtain values of the one or more physical parameters of the function of the height difference from measurements performed on a real image of the periodic structure; and determine the height difference from the model using the obtained values of the one or more physical parameters and the one or more quantities characterizing interdependence of the one or more physical parameters.

20. The system of claim 19, wherein the real image is produced by a scanning electron microscope.

* * * * *